A. A. HODGES.
FERTILIZER DISTRIBUTOR.
APPLICATION FILED APR. 21, 1921.
1,415,643.
Patented May 9, 1922.
2 SHEETS—SHEET 1.
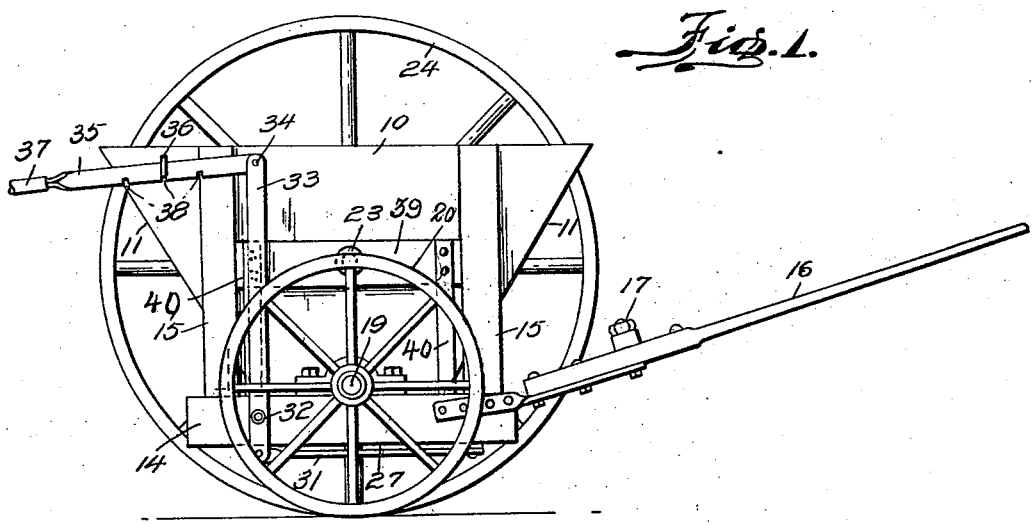
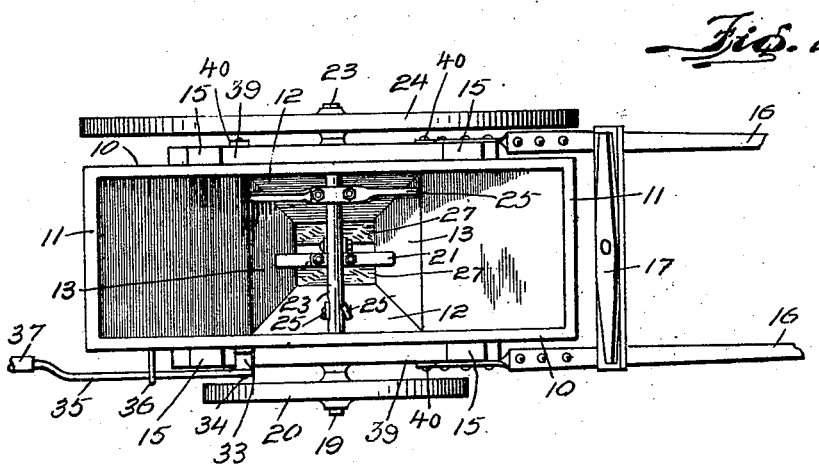
Inventor
A. A. Hodges.
By
Geo. F. Kimmel. Attorney

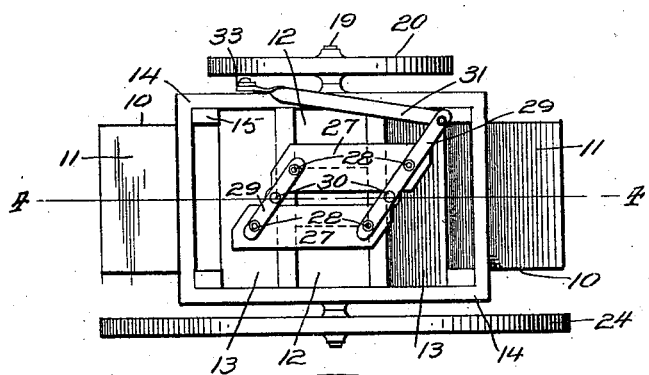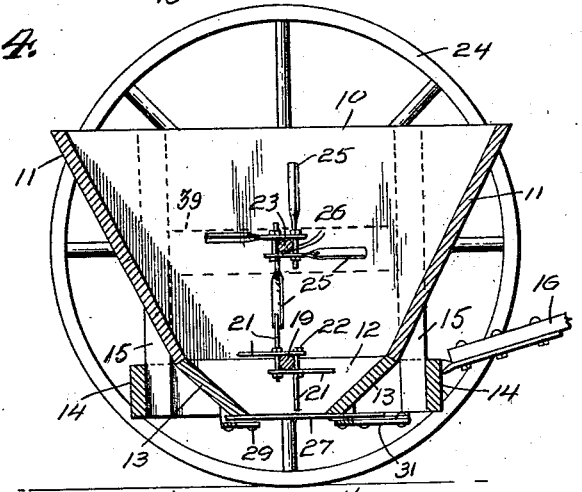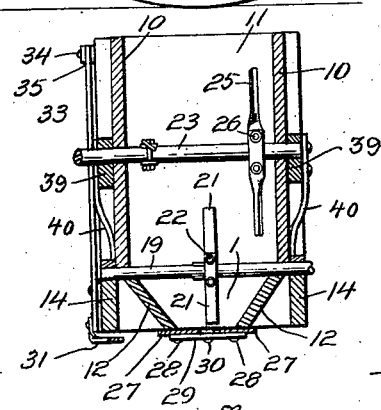

UNITED STATES PATENT OFFICE.

ALEXANDER A. HODGES, OF HEADLAND, ALABAMA.

FERTILIZER DISTRIBUTOR.

1,415,643.  Specification of Letters Patent.  Patented May 9, 1922.

Application filed April 21, 1921. Serial No. 463,261.

*To all whom it may concern:*

Be it known that I, ALEXANDER A. HODGES, a citizen of the United States, residing at Headland, in the county of Henry and State of Alabama, have invented certain new and useful Improvements in Fertilizer Distributors, of which the following is a specification.

This invention relates to improvements in fertilizer distributors, and has for one of its objects to simplify the construction and improve the operation of devices of this character.

Another object of this invention is to provide a device of this character having means whereby the fertilizer material is first thoroughly disintegrated and mixed and moved toward the center of the feed receptacle and then forcibly discharged therefrom.

With these and other objects in view the invention consists of certain novel features of construction as hereinafter shown and described and then specifically pointed out in the claim, and in the drawings illustrative of the preferred embodiment of the invention.

Figure 1 is a side elevation of the improved apparatus.

Fig. 2 is a top plan view.

Fig. 3 is a bottom plan view.

Fig. 4 is a longitudinal section on the line 4—4 of Fig. 2.

Fig. 5 is a transverse section on the line 5—5 of Fig. 2.

The improved apparatus is adapted for disintegrating, mixing and uniformly distributing fertilizer material of various kinds such as guano, land plaster, compost, and the like, and also adapted for disintegrating and uniformly distributing cotton seed and the like, and includes a receptacle or feed hopper of any required capacity and adapted to be moved over the field by any suitable power generally by draft animals.

The receptacle is preferably constructed with vertical side members 10 and inwardly and downwardly converging end members 11. At their lower portions the side members 10 are inclined inwardly as shown at 12, while the lower portion of the inclined end members 11 are still further inclined inwardly as shown at 13, the portions 12 and 13 coacting to produce a relatively contracted discharge opening to the main receptacle.

By this means the material will be drawn toward the center of the bottom of the receptacle from all sides to insure its rapid and complete discharge.

The receptacle or hopper is supported on a suitable oblong frame represented as a whole at 14. Rising from the supporting frame 14 are vertical stay members 15, which bear against the outer faces of the side members 10 of the receptacle and stiffen and strengthen the latter and increase the connection between the supporting frame and receptacle.

A suitable draft appliance, for instance a pair of thills 16 and a single tree 17, is attached at 18 to the frame 14.

Mounted for rotation through the receptacle is a lower axle 19 with one end extended to receive a relatively small traction wheel 20, the latter fast to the axle and rotative therewith. Attached to the lower axle 19 are a plurality of blades 21, arranged in close proximity and in pairs and each pair coupled by two clamp bolts 22, and the pairs disposed at right angles to each other, as shown in Fig. 4.

The lower axle 19 and the blades 21 are so located that the outer ends of the blades pass close to the discharge opening of the receptacle when the axle is rotated.

Mounted for rotation through the receptacle above the line of the lower axle 19 is an upper axle 23 with one end extended from the side opposite to the extension of the lower axle, and carrying a relatively large traction wheel 24 fast to the upper axle and rotative therewith.

Attached to the upper axle 23 within the receptacle are two sets of mixing and disintegrating blades 25, the blades being arranged in pairs and each pair coupled by two clamp bolts 26 and the pairs preferably arranged at right angles to each other, as shown in Fig. 4.

Each of the blades 25 is given a one fourth twist, as shown, with the twists reversely arranged, so that as the blades are rotated with the axle, they operate to draw the material away from the side walls, and feed it toward the center, to facilitate the discharge.

The blades 25 being located away from the center of the receptacle and the blades 21 being located centrally of the receptacle, do not interfere with each other when rotating, as will be obvious.

The discharge opening of the receptacle is substantially square, as illustrated in Figs.

4 and 5 and as indicated by dotted lines in Fig. 3.

Located below the discharge opening of the receptacle is an adjustable discharge controlling device comprising coacting plates 26 pivoted at their ends 28 to bars 29, the latter in turn pivoted at 30 midway between the pivots 28 to the end members 13 of the lower contracted portion of the receptacle.

One of the bars 29 is extended to pivotally receive an operating rod 31. Pivoted at 32 to the frame portion 14 is a lever 33, the latter pivoted at 34 to the rear end of the rod 31.

Pivoted at 34 to the upper end of the lever 33 is an operating bar 35 movable through a keeper 36 on the adjacent side 10 of the receptacle and terminating in a hand grip 37. The member 35 is provided with a plurality of notches 38 to engage the keeper 36 one at a time, to hold the member 33 and the parts associated therewith in adjusted position.

By this arrangement the plates 27 may be adjusted with their confronting edges spaced at any required distance within the range of movement of the bars 29, or to be entirely closed, by simply adjusting the operating member 35, and held at any desired position by the coaction of the keeper 36 and the notches 38.

By adjusting the plates 27 the amount of material fed from the receptacle may be accurately gaged and the required quantity per acre or other area evenly distributed.

By employing traction wheels of different sizes the motion of the axles is direct and at different speeds, the lower axle with its discharge blades operating faster than the upper axle with its disintegrating and mixing blades, thus materially increases the efficiency of the operation.

The material deposited in the receptacle is frequently in relatively large lumps, or clods, but by the novel arrangement and coaction of the parts these clods and lumps are thoroughly disintegrated and pulverized and discharged in relatively finely divided particles and uniformly distributed over the ground.

The improved apparatus is also useful in mixing and commingling different kinds of material.

The blades 21 and 25 being held only by bolts may be readily adjusted, or broken or impaired parts restored without discarding the remaining portions of the apparatus.

The blades 21 and 25 serve several purposes, first, pulverizing and cutting up clods and distributing them in relatively finely divided parts to the described mechanism, second, the mixers may be utilized to thoroughly disintegrate and commingle material of different kinds and thus avoid the necessity for the preliminary mixing of the material before it is deposited in the receptacle.

By reversibly twisting the upper blades they operate to push the material toward the center of the receptacle and downward to the lower fast rotating blades.

Any required number of the blades may be applied to each axle, depending upon the kind of work required.

It will be noted that the machine operates without the employment of the caster wheel or guiding wheel, thus materially simplifying the construction.

Attached to the outer faces of the sides 10 of the hopper are stay members 39 to support the outer ends of the upper axle 23, the members 39 being further supported by braces 40.

The preferred embodiment of the invention is disclosed in the drawings and set forth in the specification, but it will be understood that any modifications within the scope of the claim may be made in the construction without departing from the principle of the invention or sacrificing any of its advantages.

What I claim is:—

An apparatus of the class described comprising a receptacle having a discharge opening, an upper axle extending through said receptacle and adapted to carry agitating means, a lower axle extending through said receptacle and adapted to carry feeding means, a relatively large traction wheel rotative with said upper axle, and a relatively small traction wheel rotative with said lower axle, whereby the upper axle and its attachment is operative faster than the lower axle and its attachment.

In testimony whereof, I affix my signature hereto.

ALEXANDER A. HODGES.